United States Patent [19]

Steele

[11] Patent Number: 4,692,819
[45] Date of Patent: Sep. 8, 1987

[54] METHOD AND APPARATUS FOR CONTROLLING THE POSITION OF A TRANSPORTED WEB

[75] Inventor: Robert Steele, Palo Alto, Calif.

[73] Assignee: Ampex Corporation, Redwood City, Calif.

[21] Appl. No.: 854,711

[22] Filed: Apr. 16, 1986

Related U.S. Application Data

[63] Continuation of Ser. No. 646,619, Aug. 31, 1984, abandoned.

[51] Int. Cl.⁴ ............................................. G11B 15/00
[52] U.S. Cl. .................................... 360/72.1; 226/27; 360/72.2; 360/72.3; 360/73; 360/74.1; 360/74.4
[58] Field of Search ................. 226/27; 360/72.1, 72.2, 360/72.3, 73, 74.1, 74.4

[56] References Cited

U.S. PATENT DOCUMENTS

| | | | |
|---|---|---|---|
| 3,641,504 | 2/1972 | Sidline | 340/172.5 |
| 3,681,523 | 8/1972 | Sidline | 178/606 A |
| 3,736,565 | 5/1973 | Sidline | 340/172.5 |
| 4,037,260 | 7/1977 | Busby, Jr. et al. | 360/73 |
| 4,062,048 | 12/1977 | Weber | 360/72.3 |
| 4,151,566 | 4/1979 | Ohrman | 360/72.1 |
| 4,363,048 | 12/1982 | Tanaka et al. | 360/137 |
| 4,471,391 | 9/1984 | Reagan | 360/72.3 |
| 4,473,853 | 9/1984 | Corkery | 360/72.2 |

OTHER PUBLICATIONS

Journal of the Society of Motion Picture and Television Engineers, vol. 79, No. 3, Mar. 1970, Quadruplex Video-Tape Editing—An Introduction, Joseph Roizen, pp. 177–182.

Primary Examiner—George G. Stellar
Attorney, Agent, or Firm—Rodney L. Marett; Joel D. Talcott

[57] ABSTRACT

An apparatus and method for controlling the position of a web containing location identifying information thereon. In particular, a means for measuring displacement of the web independent of the location information is employed to measure the displacement of the web in a cyclic manner such that the measuring cycle is in the expected displacement intervals between identifying information. A difference between a desired position of the web determined by an operator controlled reference displacement position of the web is determined, and used for controlling the position of the web to the desired position.

18 Claims, 11 Drawing Figures

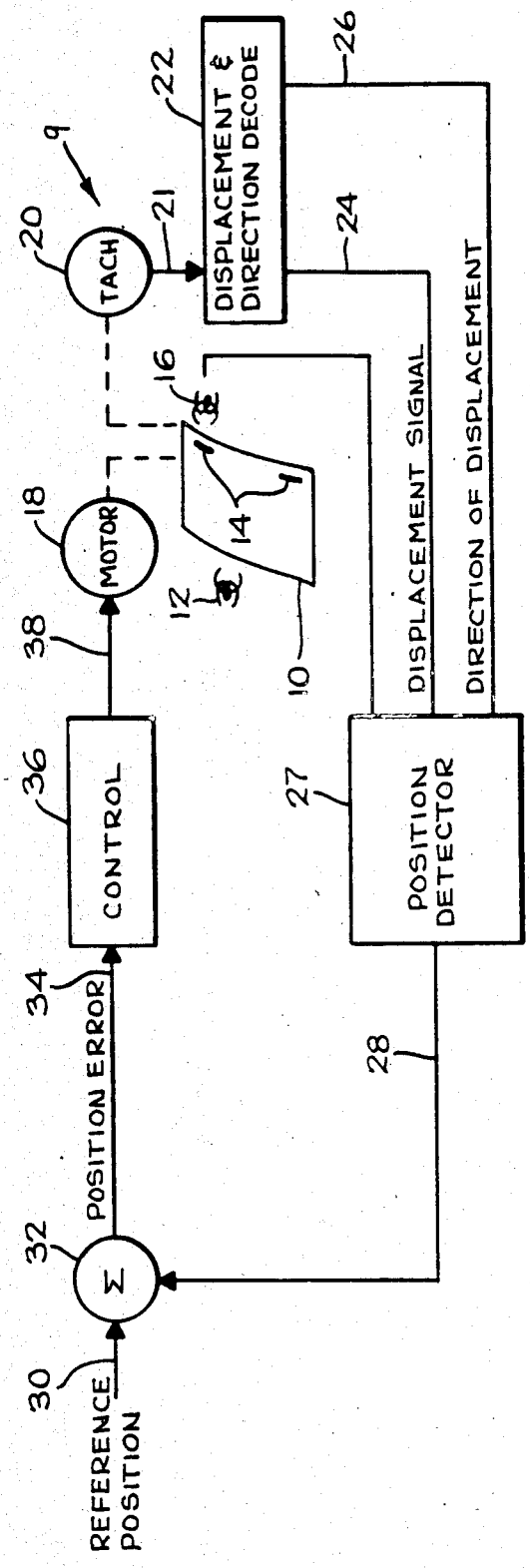
FIG_1

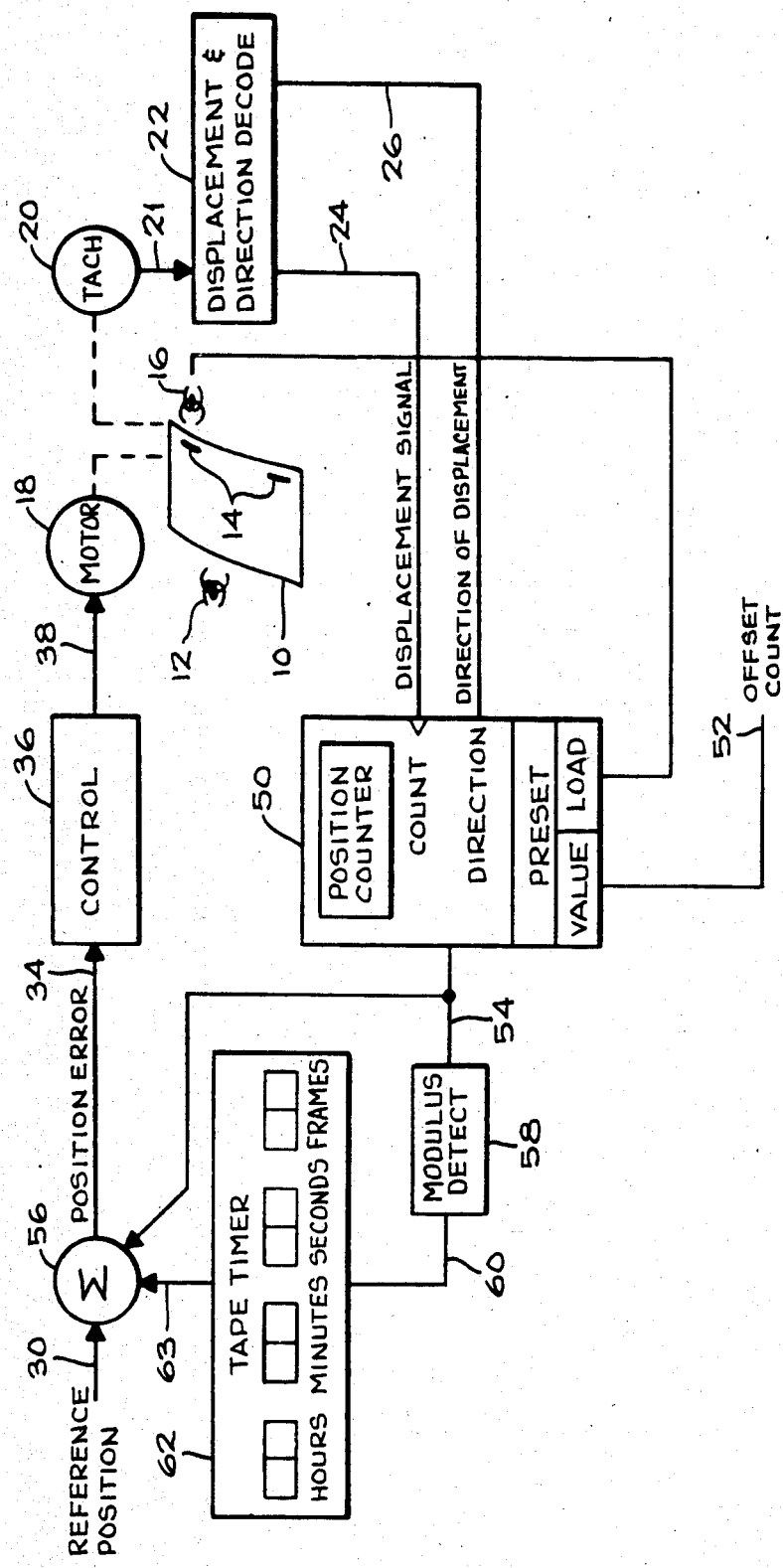
FIG_2

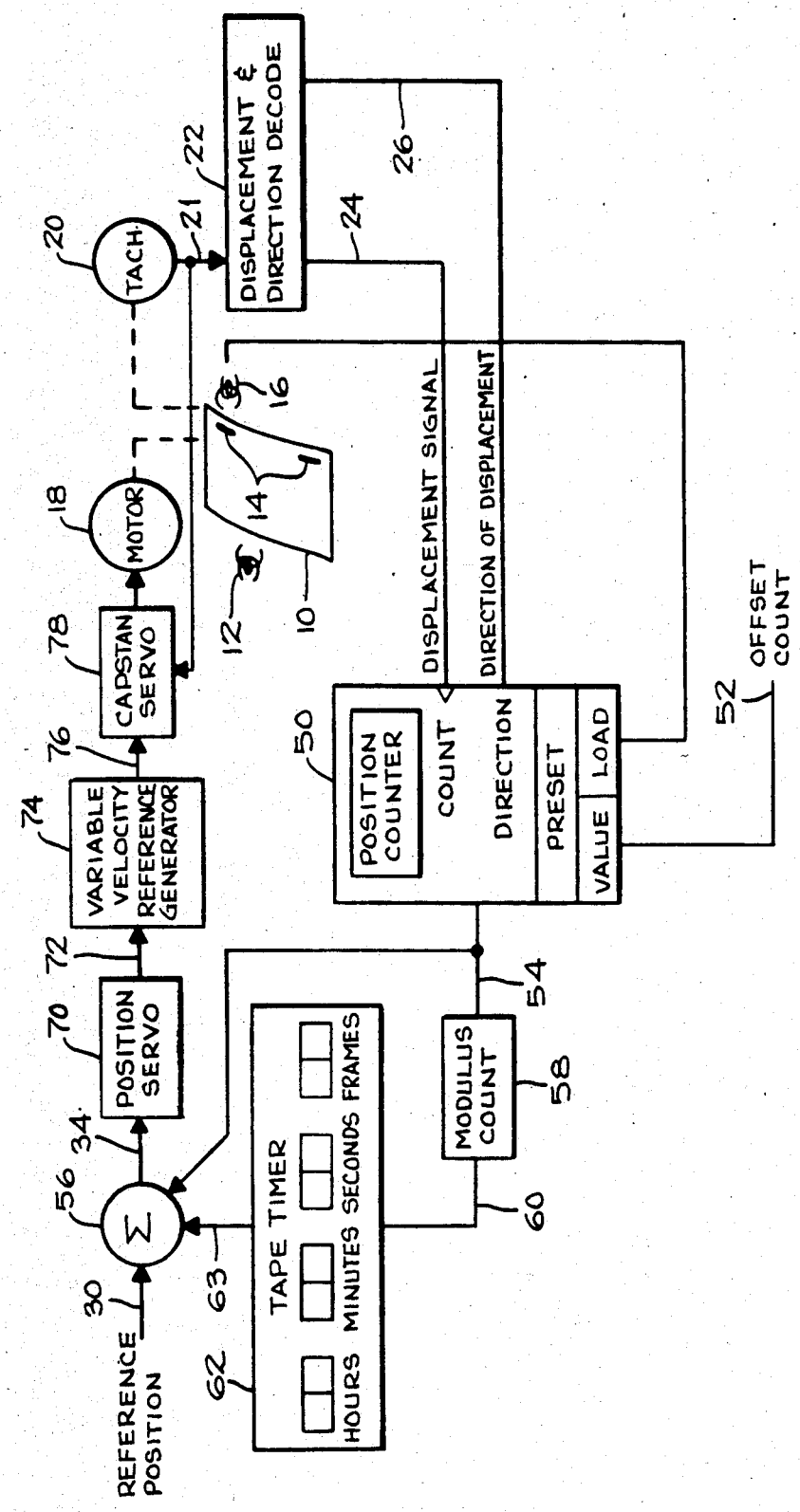
FIG_3

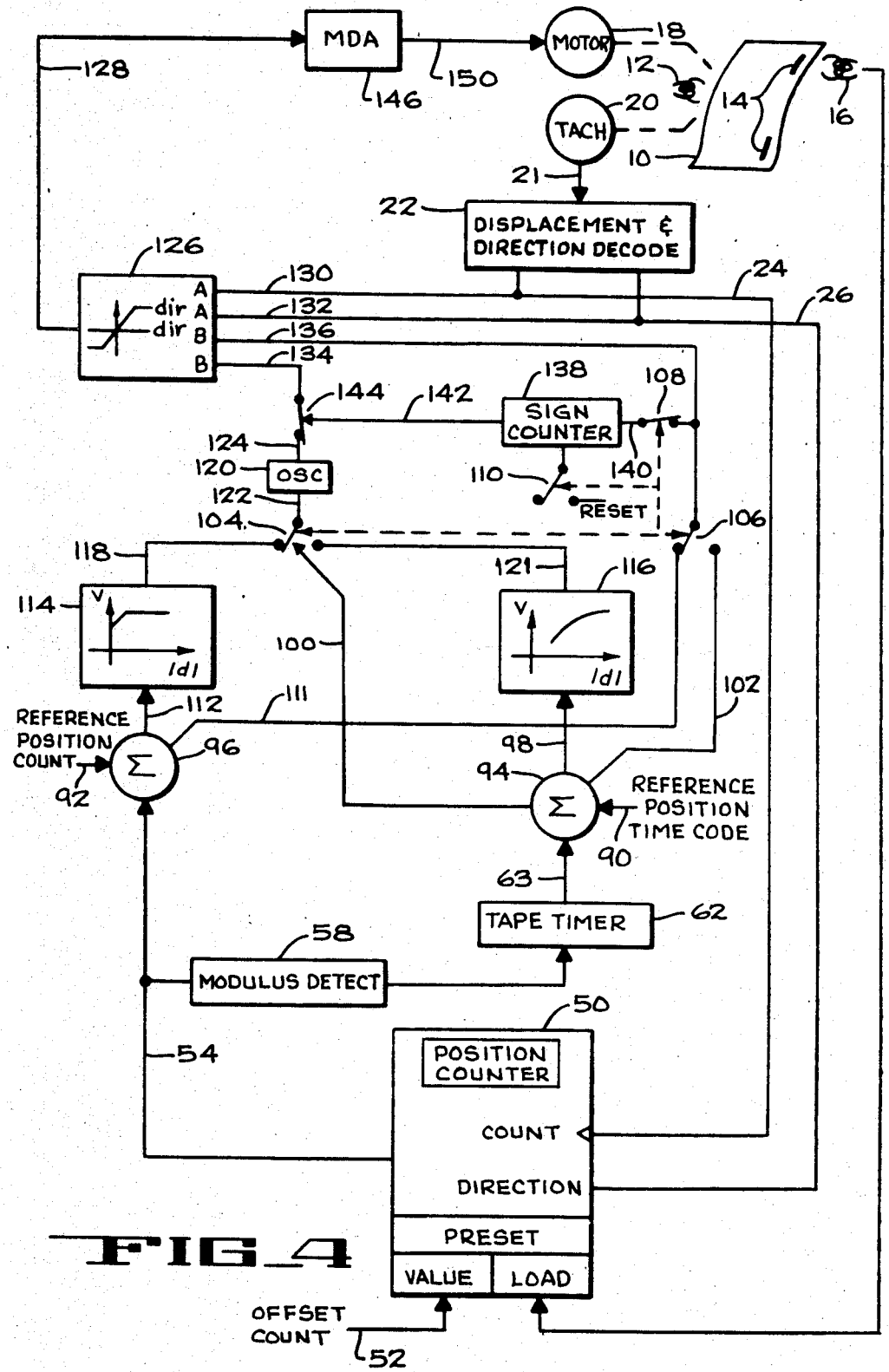
FIG_4

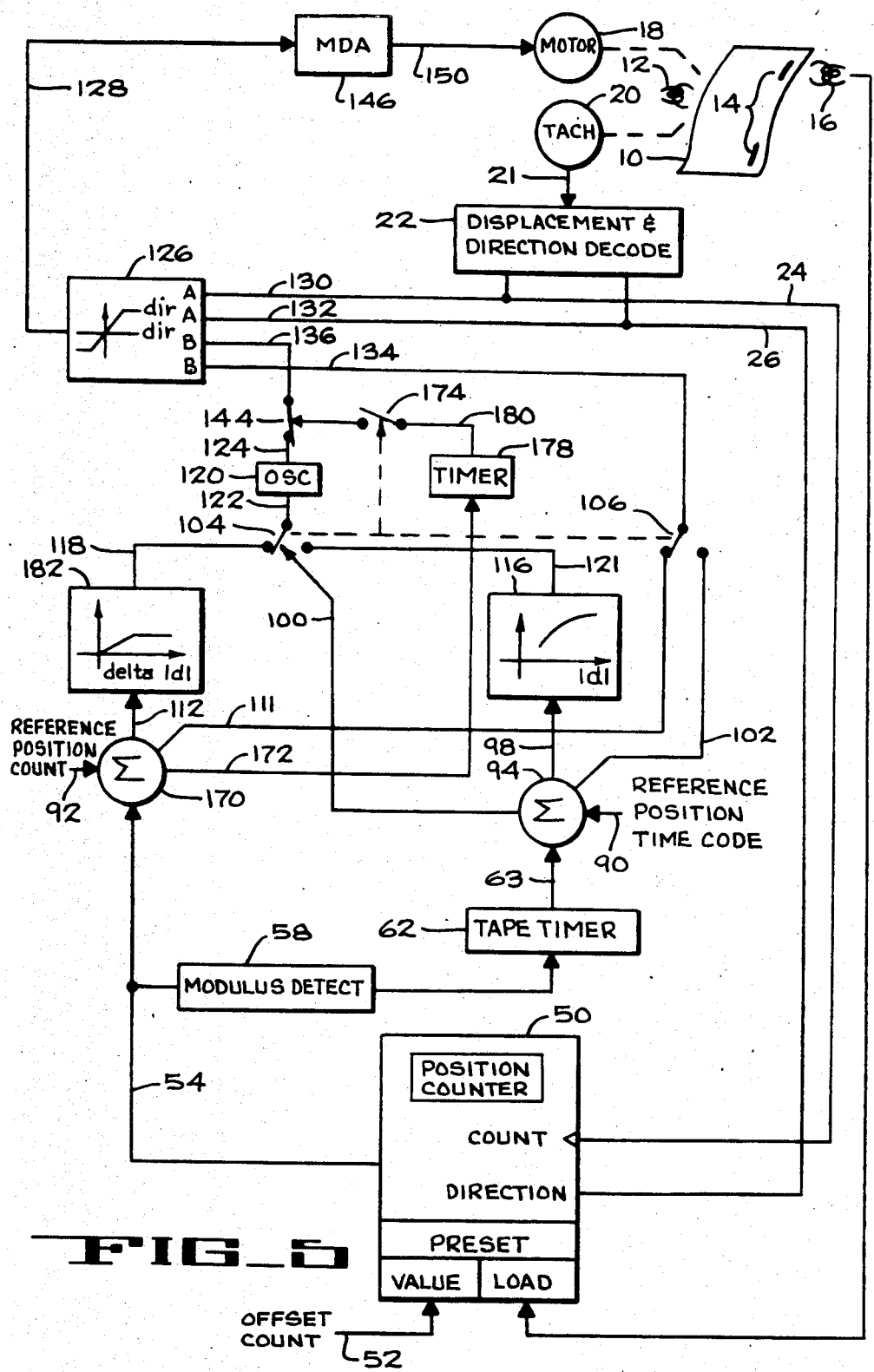
FIG_5

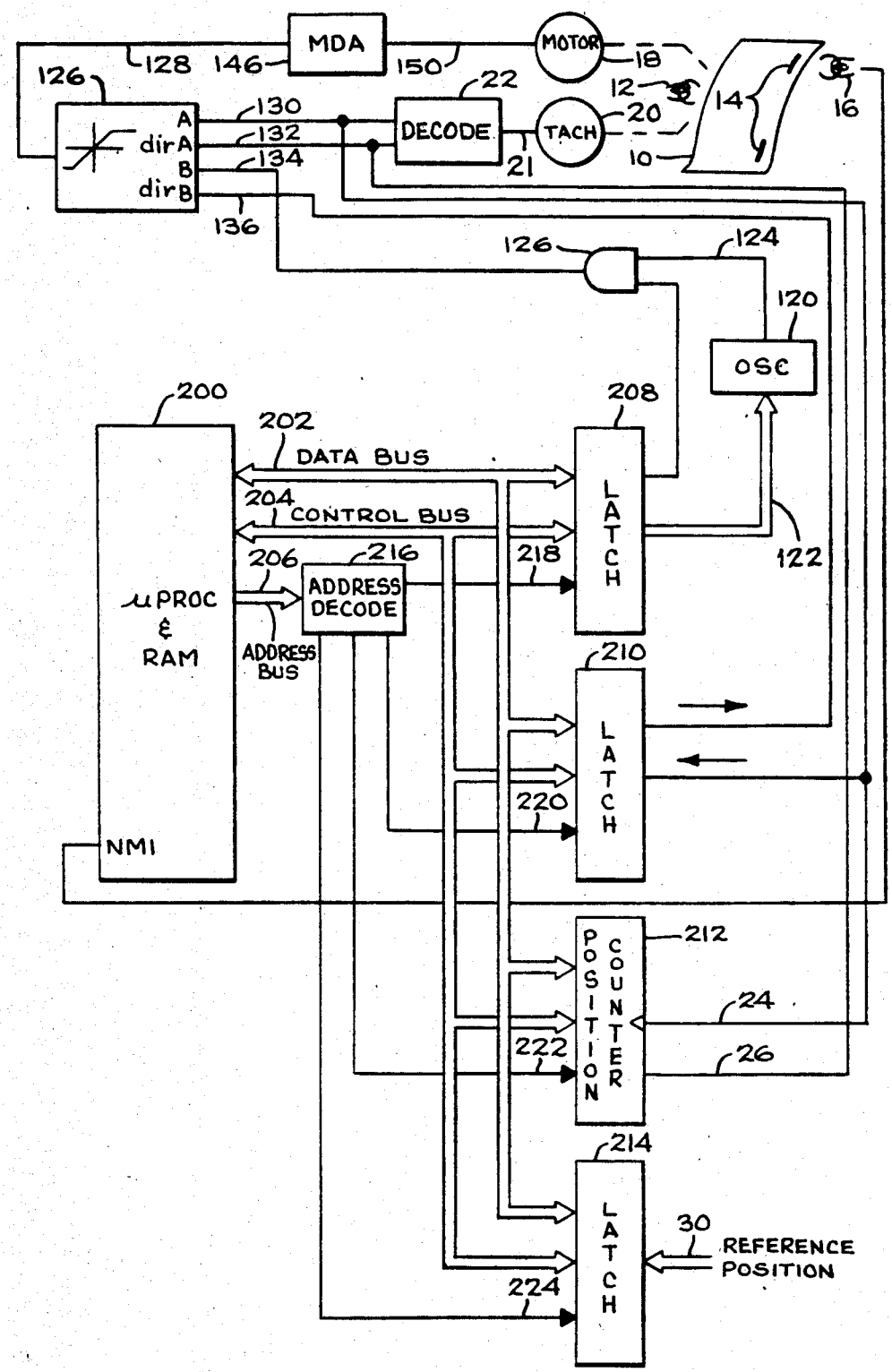
FIG_6

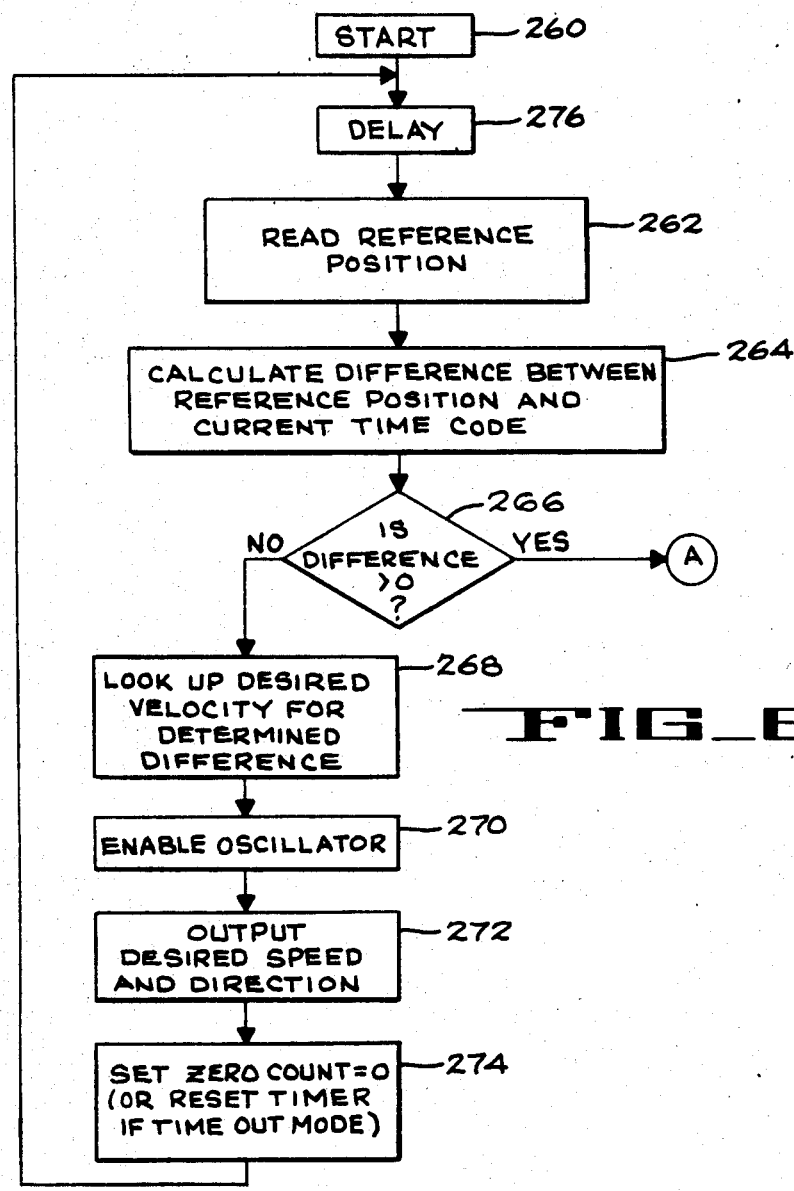
FIG_7
FIG_8A

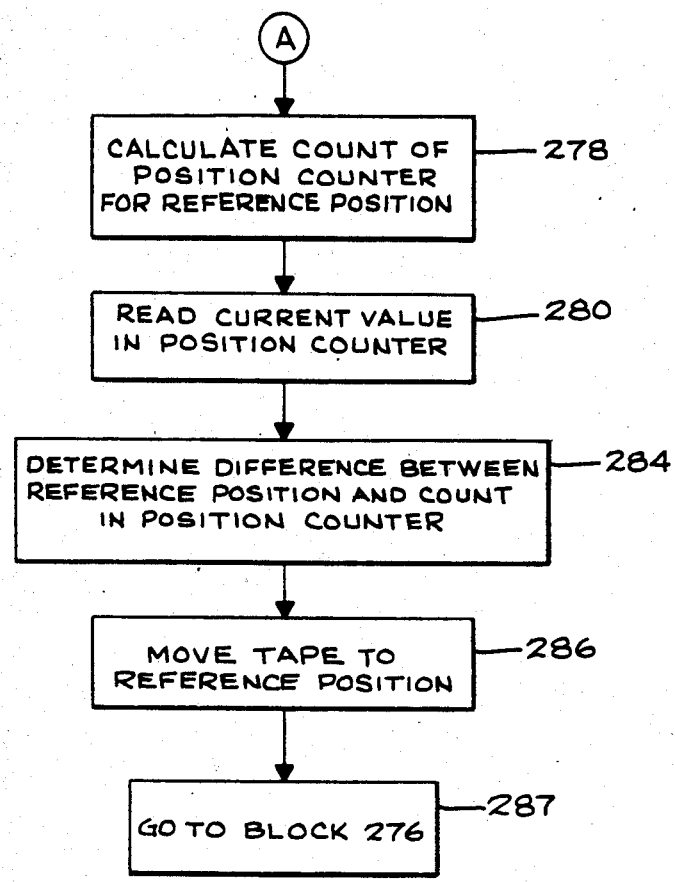
FIG_8B

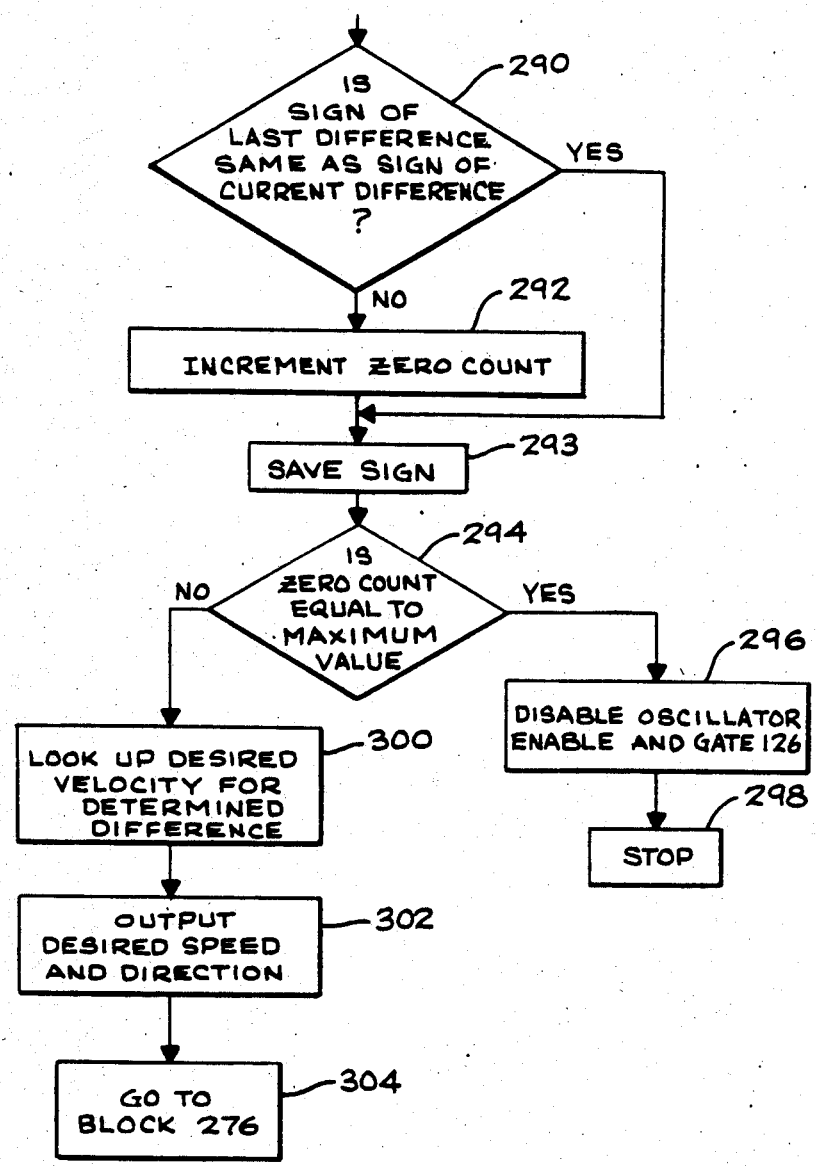
FIG_9

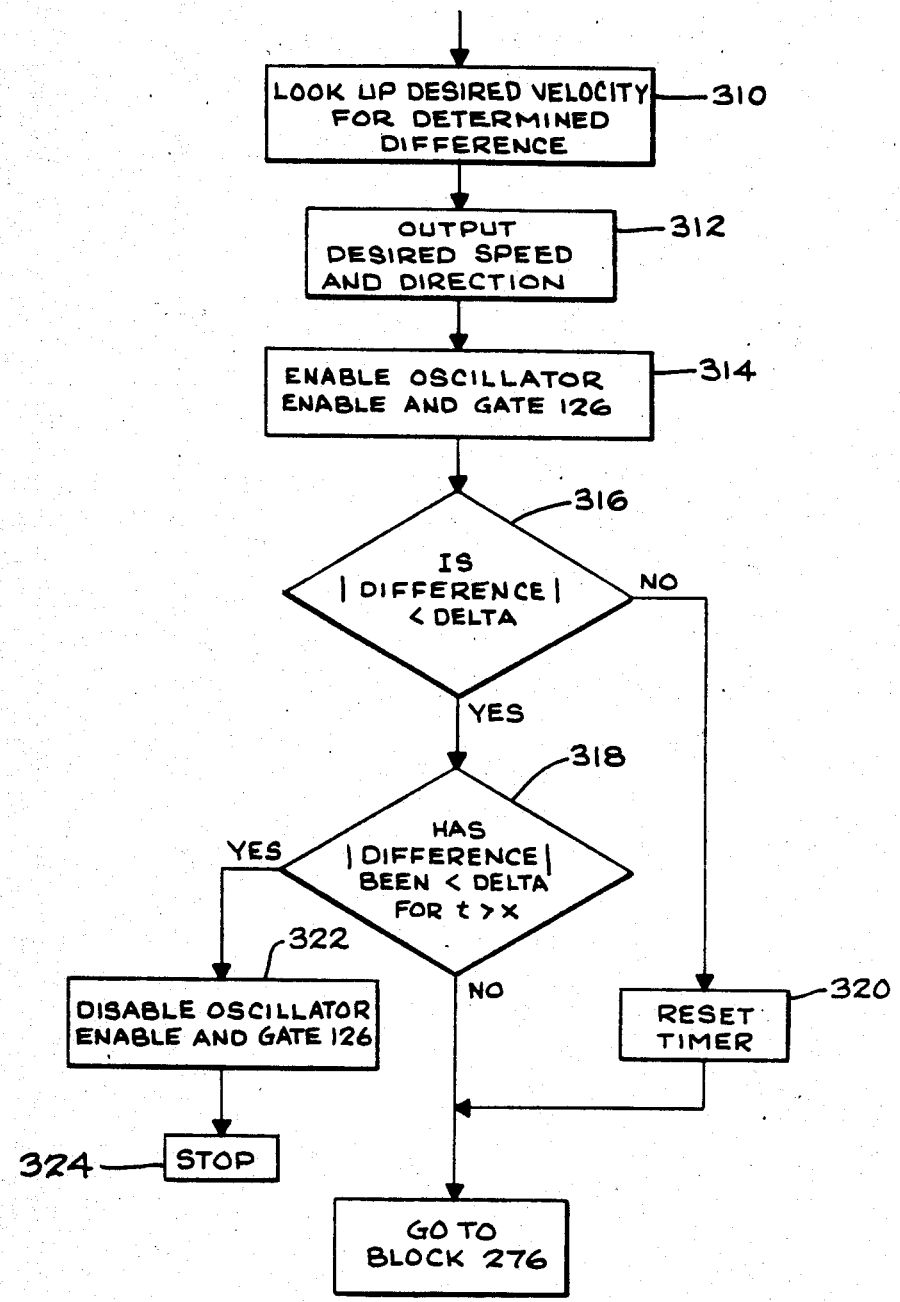
FIG_10

METHOD AND APPARATUS FOR CONTROLLING THE POSITION OF A TRANSPORTED WEB

This is a continuation of co-pending application Ser. No. 646,619 filed on Aug. 31, 1984, now abandoned.

This invention relates to positioning devices, and more particularly to a method and apparatus for controlling the position of a web transported along a path.

Many information storage systems employ a transported record medium for storing information. In these storage systems, the record medium has several, usually uniformly sized discrete, storage locations and is moved by a transport mechanism operated to position a particular one of its discrete storage locations relative to suitable means for transferring information between the record medium and an information processing system. The method and apparatus of the present invention is particularly useful for positioning magnetic tapes for magnetically storing video images. Hence, the description of the present invention will be explained in connection with positioning a magnetic tape relative to magnetic heads for transferring information between the tape and a suitable information processing system. However, as will be understood by those skilled in the art, the method and apparatus of the present invention is equally useful for positioning other transported web material.

Controlling the transport of a tape in a video tape recorder involves the control of two parameters: velocity and position. Velocity control has generally been achieved through the use of a tachometer engaging the tape to measure displacement thereof per unit time. Control of position has been achieved through the use of location identifying information previously recorded onto the tape. Such location information can consist of a complete description or address of each location. Time coded address signals, generally referred to as time code, are an example of such, and often are employed to identify locations on magnetic tapes used to record television signals. Alternatively, displacement marking signals are recorded at regular intervals to identify locations along the tape. On tape used to record television signals, the displacement marking signals are referred to as control track signals.

While the recording of location information directly onto the magnetic tape has generally provided a reliable means to determine tape position, the accuracy obtainable with such an approach still has not been completely satisfactory. Broadly stated, recorded location information serves only to define the precise position on the magnetic tape at which the location information is placed. Consequently, identification of position of a magnetic tape has generally been accurate only to the degree to which discrete locations have been specified by recorded location information. In particular, in the use of time code or control track to define locations along a magnetic tape, locations along the length of tape between two defined locations are not precisely defined. For this reason, such recorded signals do not enable precise positioning of tapes with respect to locations thereon between locations specified by the signals. Controlling the position of the tape with such signals has not been found completely satisfactory in television signal tape recorders because more than one segment of video information is contained between consecutively defined locations on the tape. In particular, recorded control track or time code information serves only to identify the location of television frames on the tape; however, two television fields comprise a single frame in commonly used television signal standards. Consequently, accurately positioning a magnetic tape with respect to a desired field has generally not been conveniently accomplished.

The ability to accurately control the positioning of a magnetic tape can be readily understood in connection with videotape editing. Unlike movie film which can be edited by physically cutting and splicing pieces together, videotape is edited by an electronic editing process wherein a segment of recorded video information is reproduced from a tape on a "source" video tape recorder to be recorded onto a different tape on a "target" video tape recorder. During this process, both recorders are controlled by a control device known as an editor. By consecutively recording different video segments from one or more source recorders onto the tape on the target recorder, a desired video production may be created from a number of separate program sources.

Video information generally must be recorded and reproduced synchronously relative to a reference that identifies a repeating multiple television field sequence defined by the phase relationships of the vertical, horizontal and color subcarrier synchronizing signals contained in a television signal. The NTSC television signal has a four-field sequence. Consequently, in creating a video program composed of electronically spliced segments from different program sources, it is desirable to maintain the proper repeating multiple television field sequence throughout the crated program. Discontinuities in the sequence introduce objectionable disturbances in the displayed video program. Such discontinuities often are introduced into the created program at the splices of the segments as a result of improper synchronization of the transport of the tapes of the source and target recorders.

Because prior art transports are capable only of positioning the tape to the nearest on-tape location identifying information, it has not been possible to assure that the transported tape will be positioned for an edit so that the required four field sequence is maintained at the splice point of adjacent segments forming the video program. Thus, it has been the practice to "rehearse" the edit to see if tape positioning was proper and then adjust it if it was not.

In accordance with the present invention, a method and apparatus are disclosed which provide for controlling the position of a web transported along a path. The web has markers thereon that identify at least a single location on the web, which are detected as the web is transported along the path to provide indications of the positions of the so identified locations with respect to the path. In addition, the displacement of the transported web along the path is monitored independent of markers or any other indicia present on the web to obtain an indication of the displacement of the web along the path. The number of displacement indications obtained for a selected displacement of the web along the path is greater that the number of markers on the length of web corresponding to the selected displacement, and are used to determine the displacement of the web following the detection of a marker. The determined displacement is indicative of the actual position of the transported web relative to the path. This so determined actual position is compared against a desired position reference, and the comparison result is used to control the position the web as it is transported along the path.

It will be helpful to the understanding of the method and apparatus of the present invention to consider an embodiment thereof arranged for use in a helical scan video tape recorder. It should be understood, however, that while the present invention will be described with respect to its embodiment in a video tape recorder, the method and apparatus of the present invention can be arranged in other embodiments suited for other web transports. Helical scan video tape recorders typically include a tachometer coupled to the tape. Usually, a high resolution tachometer is employed. The tachometer generates a plurality of signals in response to displacement of the tape along the path. In addition, the tape commonly has markers in the form of control track signals and time code signals recorded along tracks extending lengthwise of the tape at intervals defining pairs of adjacent tracks of recorded video information. The recorded signal format of these marker signals are selected to identify tracks containing interlaced fields forming a full frame of video information. Marker signals and tachometer signals are coupled to a counter having a count modulus equal to an integral multiple of the number of tachometer signals generated while the tape is transported a distance occupied by two tracks of recorded video information. The marker signals from the tape are used to set the counter to a desired count and the tachometer signals clock the counter through its count sequence. Consequently, the counter will count tachometer pulses in a cyclic manner in response to displacement of the tape, and thereby provide a representation of the position of the tape as it is transported along the path. The tachometer count thus represents the displacement of the tape following each received control track (or time code) signal from which the actual position of the tape along the path can be determined relative to locations on the tape other than those specified by the control track or time code signals.

The transport of the tape is controlled by comparing the count of tachometer signals to a reference count indicative of a desired tape position and deriving therefrom a transport control signal that is coupled to alter the tape transport to eliminate deviations between the count of tachometer signals and the reference count.

In this manner, a recorder is no longer limited to positioning the tape in accordance with location identifying information recorded thereon. The tape can also be positioned at any desired point removed from such location information through the use of displacement information, derived from tachometer signals independent of the location information (or any other indicia on the tape), used in conjunction therewith. This enables sufficiently accurate control of tape positioning such that the tape can be stopped with the recording head of a recorder positioned at any selected field. Further, by the use of a tachometer of sufficient resolution, the tape may be stopped with the head accurately centered over the selected field such that operation of the recorder during recording and reproduction of video information may be optimized.

The foregoing and other features of this invention will be more completely understood upon consideration of the following detailed description and appended claims taken in conjunction with the following drawings, of which:

FIG. 1 is a schematic block diagram illustrating a preferred embodiment of the web position control apparatus in accordance with the present invention;

FIG. 2 is similar to FIG. 1, with greater detail with respect to the position detector and summing means illustrated in FIG. 1;

FIG. 3 is similar to FIG. 2, with greater detail with respect to the control means of FIG. 2;

FIG. 4 is a schematic functional block diagram illustrating a preferred embodiment in accordance with the present invention for controlling the position of a magnetic tape;

FIG. 5 is similar to FIG. 4, and illustrates an alternate embodiment of apparatus for controlling the position of magnetic tape in accordance with the present invention;

FIG. 6 illustrates an alternate embodiment for controlling the position of magnetic tape in accordance with the present invention employing a microprocessor;

FIG. 7 illustrates the sequence of steps the microprocessor of FIG. 6 performs in initializing the position counter of the apparatus of FIG. 6;

FIGS. 8A and 8B together illustrate the sequence of steps the microprocessor of FIG. 6 performs in positioning magnetic tape in accordance with the method and apparatus of the present invention;

FIG. 9 illustrates the sequence of steps the microprocessor of FIG. 6 performs in one embodiment of the present invention; and FIG. 10 illustrates the sequence of steps the microprocessor of FIG. 6 performs in an alternate embodiment of the present invention.

The present invention is a method and apparatus which provide for controlling the position of a web transported along a path. As previously stated, while the present invention will have a broad range of applications, the method and apparatus of the present invention will be described with respect to positioning a web of magnetic tape used in connection with apparatus for the recording and reproducing of video information from the tape. Accordingly, FIG. 1 illustrates apparatus 9 for controlling the position of a magnetic tape in accordance with the present invention. Referring to FIG. 1, a magnetic tape 10 is displaced along a path between a supply and take-up reel (the path, supply and take-up reel not illustrated). Video transducing means 12 functions to transfer video information either onto or off of magnetic tape 10. Magnetic tape 10 has location identifying information 14 recorded thereon. While the nature of the location information 14 may be of any format suitable for defining either a single or a plurality of positions along the magnetic tape, e.g. time code or control track information, the location information 14 will herein be assumed to be of a control track format, as more fully described in SMPTE Recommended Practice, No. RP 85-1979, entitled "Tracking-Control Record For 1-Inch Type C Helical-Scan Video Tape Recording".

The magnetic tape 10 is displaced along the path by motor 18. In this regard it is understood that while one or several motors may be employed in displacing magnetic tape 10 along the path, the function is illustrated generally by motor 18. Displacement of magnetic tape 10 along its path by the motor 18 results in the reading of location information 14 by transducing means 16. Tachometer 20 is coupled to magnetic tape 10, and functions to monitor the displacement of magnetic tape 10 along the path. Tachometer 20 generally consists of a rotatable shaft coupled to magnetic tape 10 in such a manner that displacement of magnetic tape 10 along the path results in rotation of said tachometer shaft. Rotation of the shaft of the tachometer results in the generation of signals 21 which indicate both the direction and amount of rotation of the shaft of tachometer 20, and consequently the direction and amount of displacement of magnetic tape 10 along the path. Tachometer 20 is coupled to displacement and direction decode 22 which functions to produce displacement signal 24 responsive to displacement of magnetic tape 10, and direction of displacement signal 26 responsive to the direction of displacement of magnetic tape 10. The design of tachometer 20 is such that the number of signals produced by tachometer 20 in response to the displacement of magnetic tape 10 along the path between sequential positions 14 of location information is greater than one, i.e., tachometer 20 produces a plurality of signals indicating displacement of magnetic tape 10 along the path between sequential positions 14 containing location information. Consequently, tachometer 20 serves to measure displacement of magnetic tape 10 between sequential positions 14 on magnetic tape 10 containing location information as magnetic tape 10 is displaced along the path and, therefore, the position of the tape along the path. The resolution with which tachometer 20 is capable of detecting displacement between sequential positions 14 containing location information on magnetic tape 10 is determined by the number of signals produced by the rotation of tachometer 20 in response to the displacement of magnetic tape 10. It should be appreciated that the signals provided by transducing means 16 represent location information which was previously placed on magnetic tape 10, while displacement information produced by tachometer 20 results from the detection of displacement of magnetic tape 10 along the path.

Location information 14 defining discrete positions along magnetic tape 10 as determined therefrom by transducing means 16 is coupled to position detector 27. In addition, displacement signal 24 and direction of displacement signal 26 are likewise coupled to position detector 27. Position detector 27, responsive to location information 14 from transducing means 16, displacement signal 24 and direction of displacement 26, functions to determine the current position of magnetic tape 10 with reference to video transducing means 12, and produces a signal 28 indicative thereof. Reference position signal 30 indicates generally a position on magnetic tape 10 which is desired to be positioned relative to transducing means 12. Signal 28 produced by position detector 27 and reference position signal 30 are both coupled to summing means 32. Summing means 32 functions to determine the difference between two signals coupled thereto, and produces a position error signal 34 in accordance with said difference. Position error signal 34 is coupled to control 36. Control 36, responsive to position error signal 34, functions to produce control signal 38 to control motor 18 in such a manner that the desired position on magnetic tape 10 as represented by reference position signal 30 is positioned relative to transducing means 12.

FIG. 2 provides further descriptive information with respect to position detector 27 and summing means 32. FIG. 2 is similar to FIG. 1, and like elements have been given corresponding reference designations. Referring to FIG. 2, position counter 50 functions to accumulate signals produced by tachometer 20 according to displacement signals 24 and the direction of displacement of magnetic tape 10 as indicated by direction of displacement signal 26 from an initial value defined by offset count 52. Upon the detection of location information by transducing means 16, a predetermined offset count 52 will be loaded into position counter 50. Offset count 52 represents a value to which position counter 50 will either add or subtract subsequent displacement signals 24 received from the displacement and direction decode 22 according to direction of displacement signal 26. The count thereby accumulated in position counter 50 represents displacement of magnetic tape 10 from a position thereon containing location information 14. In particular, in response to displacement of magnetic tape 10 in a forward direction as indicated by direction of displacement signal 26, position counter 50 functions to add to the count accumulated by position counter 50 subsequent displacement signals 24. In a similar manner, in response to displacement of magnetic tape 10 in a reverse direction as indicated by direction of displacement signal 26, position counter 50 functions to subtract from the count accumulated in position counter 50 subsequent displacement signals 24. Consequently, the count accumulated by position counter 50 provides information with respect to displacement of magnetic tape 10 relative to the position of location information 14. The particular value chosen for offset count 52 is application dependent, and generally provides for the count contained in position counter 50 to be a desired value when a preselected location on magnetic tape 10 is at a desired location along its path of transport relative to transducing means 12, as will be more fully discussed hereinafter.

As previously discussed, position counter 50 is designed to count in a selected count modulus, which is related to the number of displacement signals produced by tachometer 20 between sequential position on magnetic tape 10 containing location information 14. While the count modulus is generally application dependent, an example will serve to illustrate the relationships involved. Assuming a total of 210 pulses is produced by tachometer 20 between sequential positions on magnetic tape 10 containing location information 14, the count modulus of position counter 50 is preferably selected to likewise be equal to 210. By choosing the count modulus of position counter 50 equal to the number of pulses produced by tachometer 20 between sequential positions on magnetic tape 10 containing location information 14, and a value of 0 for offset count 52, position counter 50 would count through a complete single count sequence, i.e., from 0 to 209, in response to displacement of magnetic tape 10 between sequential positions containing location information 14. In particular, upon the passing of a location on magnetic tape 10 containing location information 14 adjacent to transducing head 16, position counter 50 would be thereby loaded with offset count 52 equal to 0. Thereafter, displacement of magnetic tape 10 in a forward direction would result in the count contained in position counter 50 being subsequently incremented. Upon the next sequential location on magnetic tape 10 containing location information 14 passing adjacent to transducing head 16, position counter 50 receives the 210th pulse from tachometer 20, which resets the counter 50 to 0 to begin the count sequence again. Ordinarily, the receipt of the 210th pulse from the tachometer 20 occurs, coincidently, with the offset count 0 being loaded in the counter 50 in response to occurrence of the location information 14. It should be further noted, that in the absence of a tape location containing location information 14, position counter 50 will nevertheless continue to function properly. It should be understood that the foregoing relationships were given by way of illustration only, and are not intended to be limiting of the invention herein; other numerical relationships being likewise possible.

The output 54 of position counter 50 consequently contains a count which represents linear displacement of magnetic tape 10 between locations thereon containing location information. The output 54 of position counter 50 is coupled to summing device 56 and modulus detect 58. Modulus detect 58 functions to detect the count from position counter 50 representative of displacements of magnetic tape 10 between sequential locations containing location information 14, and in response thereto produces a count signal 60 to tape timer 62. In the preceding illustrative example, modulus detect 58 would detect the 209th count of position counter 50, and generate count signal 60 in response thereto. Tape timer 62 functions to accumulate count signals 60 from modulus detect 58 in a hours-minutes-seconds-frames format, as is generally used in connection with video recording apparatus, to measure displacement of associated magnetic tape 10, and produces tape timer signal 63 indicative of the contents of tape timer 62. Tape timer 62 is initially set to an arbitrary value, such as zero, before displacement of magnetic tape 10, and subsequent displacement of magnetic tape 10 measures the displacement of magnetic tape 10. The measured displacement of magnetic tape 10 in the hours-minutes-seconds-frames format is coupled to summing means 56 by tape timer signal 63. Reference position signal 30 is likewise coupled to summing means 56, and represents a location on magnetic tape 10 which is desired to be positioned adjacent to video transducing means 12. In the illustrative embodiment discussed herein, reference position 30 represents a desired position on magnetic tape 10 with respect to magnetic transducing head 12 in a format of hours-minutes-seconds-frames and a count according to the count in position counter 50 according to tachometer 20. Summing means 56 functions to determine the difference between the desired position of magnetic tape 10 with respect to transducing means 12, as represented by reference position 30, and the current position of magnetic tape 10 with respect to transducing means 12, as indicated collectively by tape timer 62 and position counter 50, and issue a position error signal 34. Control 36 responsive to position error signal 34 functions to generate signals to direct motor 18 to position magnetic tape 10 in accordance with position error signal 34.

It is generally recognized in dealing with web position control devices, that the velocity with which a selected location is advanced toward a desired position from a current position is determined by the distance separating the current position of the selected location from the desired position. Broadly stated, the larger the distance from the desired location, the greater will be the desired velocity; as the desired position is approached, the desired velocity will accordingly decrease in such a manner that the desired velocity at the desired position will be zero. Such relations generally provide for the movement between differing positions with a high degree of accuracy in a minimum amount of time. Consequently, in moving magnetic tape 10 from a current position with respect to transducing means 12 to a desired position, as represented by reference position 30, a set of differing velocities may well be chosen for the movement of magnetic tape 10 between the two differing positions according to the differing distances therebetween. Consequently, control 36 functions to provide for the displacement of magnetic tape 10 between a desired position, as represented by reference position 30, and a current position, as represented collectively by signals 63 and 54 from tape timer and position counter 50 respectively, according to a set of differing velocities: the difference in distance between the current position and the reference position defining a desired velocity for displacement of magnetic tape 10.

FIG. 3 provides further descriptive information with respect to control 36. FIG. 3 is similar to FIG. 2, and like elements have been given corresponding reference designations. Referring to FIG. 3, position servo 70, responsive to position error 34, functions to generate position error signal 72 to control variable velocity reference generator 74 for use by capstan servo 78. Capstan servo 78 is responsive to position error signal 76 and tachometer signal 21 to control the velocity of magnetic tape 10 according to position error signal 76 through the control of motor 18. Consequently, FIG. 3 illustrates functional apparatus incorporating the apparatus and method of the present invention for positioning magnetic tape 10 to reference position 30, with the velocity at which magnetic tape 10 is transported from a current position to reference position 30 determined by the amount of displacement of magnetic tape 10 therebetween.

FIG. 4 illustrates a preferred embodiment of apparatus for controlling the position of magnetic tape 10 with respect to transducing means 12 incorporating the apparatus and method of the present invention.

FIG. 4 is similar to FIG. 3, and like elements have been given corresponding reference designations. Referring to FIG. 4, the desired position represented by a reference is collectively comprised of two signals: reference position time code 90 and reference position count 92. Broadly stated, reference position time code signal 90 represents the desired location on magnetic tape 10 with respect to a particular location as defined by a location information 14 on magnetic tape 10. Reference position count 92 represents the desired location on magnetic tape 10 with respect to a particular displacement on magnetic tape 10 from the location defined thereon by reference position time code 90 in terms of a count value produced by tachometer 20 in position counter 50. Reference position time code 90 and reference position count signal 92 are coupled respectively to time code summing means 94 and count summing means 96 respectively. Time code summing means 94 functions responsive to reference position time code 90 and tape timer signal 63 to produce position time code error signal 98 indicative of the difference in displacement between the current position of magnetic tape 10 with respect to transducing means 12 as represented by tape timer signal 63 and the desired position as represented by reference position time code 90. Time code summing means further produces zero difference signal 100 and sign signal 102. Zero difference signal 100 functions to indicate when the difference between tape timer signal 63 and reference position time code 90 is zero, and is coupled to operate switches 104, 106, 108 and 110, as will be further discussed hereinafter. Time code summing means 94 further produces time code sign signal 102, which functions to indicate if the current position of magnetic tape 10 is past the desired position by producing a signal indicative of the sign of the difference between the respective positions indicated by reference position time code 90 and tape timer signal 63. In a similar fashion, count summing means 96 produces position count error signal 112 indicative of the difference between the current position of magnetic tape 10 with respect to sequential locations therealong containing location information 14 and the desired position defined by reference position count 92. Count summing means 96 further produces sign signal 111, which indicates if the tape 10 has been transported beyond the desired position by producing a signal indicative of the sign of the difference between the respective positions indicated by reference position count signal 92 and output 54 from position counter 50. Count velocity distance profile means 114 is responsive to position count error signal 112 to produce desired count speed signal 118, which indicates the desired speed according to the absolute value of the difference in position between the reference position and the current tape position. In a similar manner, time code velocity distance profile means 116 is responsive to position time code error signal 98 to produce a desired time code velocity signal 121, which indicates the desired speed according to the absolute value of the difference between the sequential position 14 on magnetic tape 10 and a reference position as represented by reference position time code 90.

Oscillator 120 is responsive to oscillator input signal 122 to produce oscillator output signal 124 having a frequency proportional to oscillator input signal 122. Switch 104 is responsive to zero difference signal 100 to selectively couple desired count velocity signal 118 or desired time code velocity signal 121 to oscillator 120 as the oscillator input signal 122. In particular, in response to a detected difference of zero between reference position time code signal 90 and tape timer signal 63, switch 104 couples desired count velocity signal 118 to oscillator 120. In response to a detected difference of non-zero between position time code signal 90 and tape timer signal 63, switch 104 couples desired time code velocity signal 121 to oscillator 120.

A phase comparator 126 has two sets of inputs: a first set comprised of phase comparator input signal A 130 and phase comparator input signal A direction 132; and a second set comprised of phase comparator input signal B 134 and phase comparator input signal B direction 136. Phase comparator 126 produces phase comparator output signal 128 in response to an accumulated difference between phase comparator input signal A 130, phase comparator input signal A direction 132 and phase comparator input signal B 134, phase comparator input signal B direction. The functions of phase comparator 126 with respect to the signals comprising the first set are identical to the operation of an up/down counter having the count input thereto coupled to phase input signal A 130, and the direction of count coupled to phase input signal A direction 132. Consequently, the operation of phase comparator 126 with respect to the signals comprising the first set function to count the number of pulses occurring on phase comparator input A 130 in a direction determined by phase comparator input signal A direction 132. The operation of phase comparator 126 with respect to the second set of signals is identical to that of the first set. Phase comparator 126 produces an analog output signal 128 proportional to the difference between the counts accumulated as a result of the two sets of signals. The output signal 128 is provided to a motor drive amplifier 146, which responds by generating motor drive signal 150 for driving the motor 18.

In addition, the output of phase comparator 126 is limited to ensure that phase comparator output signal 128 remains within a pre-selected range of values. The predetermined values are defined by the characteristics of the apparatus to drive motor 18, and are consequently application dependent.

Displacement signal 24 and direction of displacement signal 26 from displacement and direction decode 22 are coupled to phase comparator input signal A 130 and phase comparator input signal A direction 132 respectively. Switch 106 is responsive to zero difference signal 100 to selectively couple count sign signal 111 time code sign signal 102 to phase comparator input signal B direction 136. In particular, in response to a detected difference of zero between reference position time code 90 and tape timer signal 63, switch 106 couples count sign signal 111 to phase comparator input signal B 136, and in response to a nonzero detected difference between reference position time code 90 and tape timer signal 63, switch 106 couples time code sign signal 102 to phase comparator input signal B direction 136.

A sign counter 138 is responsive to sign count input signal 140 to count the number of times sign count input signal 140 changes state, producing sign count output signal 142 when the number of times sign count input signal 140 changes state is greater than a predetermined number of times, as discussed more fully hereinafter. Switch 108 is responsive to zero difference signal 100 to couple either count sign signal 111 or time code sign signal 102, selected by switch 106 as previously discussed, to sign count input signal 140. In particular, in response to a detected difference of zero between reference position time code 90 and tape timer signal 63, switch 106 couples count sign signal 111 sign count input signal 140 as selected by switch 106, and in response to a non-zero detected difference between reference position time code 90 and tape timer signal 63, operates to disconnect sign count input signal 140 from either of said signals. Sign counter 138 is further responsive to switch 110 to either perform the previously discussed counting of the number of times sign count input signal 140 changes state, or in the alternative, to remain in a reset state. In particular, in response to detected difference of zero between reference position time code 90 and tape timer signal 63, switch 110 operates to permit sign counter 138 to perform the previously discussed function, and in response to a non-zero detected difference between reference position time code 90 and tape timer signal 63 functions to reset the operation of sign counter 138, i.e., to begin counting subsequent occurrences of changes in sign count input signal 140 from an initial count of zero. Switch 144 is responsive to sign count output signal 142 to couple oscillator output signal 124 to phase comparator input signal B 134. In particular, in response to sign count input signal 140 changing state greater than the predetermined number of times, switch 144 functions responsive to sign count output signal 142 to disconnect oscillator output signal 124 from phase comparator input signal B 134.

The foregoing described apparatus of FIG. 4 operates to alternate the direction of transport of the tape 10 a preselected number of times so as to alternately position the desired location on the tape 10 on opposite sides of transducing means 12 the preselected number of times, and thereafter terminate the process. The operation of tachometer 20, direction and displacement decode 22, position counter 50, modulus detect 58 and tape timer 62 function as previously discussed to establish a desired location of magnetic tape 10 with respect to transducing means 12. In response to zero difference signal 100 from summing means 94 indicating a non-zero detected difference between a reference position as indicated by reference position time code signal 90 and a current position as reflected by tape timer 62, zero difference signal 100 operates switches 104, 106, 108 and 110 to positions previously discussed. Thereafter, time code velocity distance profile 116 operates responsive to position time code error signal 98 to produce a series of pulses to phase comparator input signal B 134 from oscillator 120 having a frequency determined by position time code error signal 98. Phase comparator 126 in response thereto produces a corresponding phase comparator output signal 128, which is coupled to the motor drive amplifier 146 to move magnetic tape 10 according to the desired velocity. Displacement of magnetic tape 10 in response thereto is detected by tachometer 20 which produces displacement signal 24 and direction of displacement 26 according to the detected displacement of magnetic tape 10. Consequently, the foregoing will operate to result in displacement of magnetic tape 10 toward the desired position relative to the transducing means 12 in accordance with the velocity determined by time code velocity distance profile means 116. When magnetic tape 10 has been positioned with respect to transducing means 12 such that the difference between reference position time code signal 90 and tape timer signal 63 is zero, zero difference signal 100 operates switches 104, 106, 108 and 110 as previously discussed. With the aforesaid switches in the aforedescribed positions, the apparatus of FIG. 4 according to the method and apparatus of the present invention operates to alternate the desired location on the magnetic tape 10 about the transducing means 12 a selected number of times as determined by sign counter 138. In particular, phase comparator 126 operates to position magnetic tape 10 with respect to transducing means 12 according to the velocity determined by count velocity distance profile means 114. In the preferred embodiment, count velocity distance profile means 114 functions to define a non-zero velocity in response to a zero value of position counter error signal 112. Consequently, magnetic tape 10 will be alternately moved between opposite sides of the transducing means 12 a number of times determined by sign counter 138. In particular, in response to a non-zero distance between the reference position and the current position on magnetic tape 10, phase comparator 126 produces a signal to position magnetic tape 10 in a direction to reduce the amount of the difference. This process will continue until the difference becomes zero. As count velocity distance profile means 114 produces a non-zero value for velocity in response to a zero distance from a reference position as previously discussed, the reference position on magnetic 10 will be moved past the location of the transducing means 12, thereby producing a change in the sign of the difference between reference position 92 and the current position signal 54, which is reflected by count sign signal 111. Count sign signal 111 will thereby operate to change the direction of movement of magnetic tape 10 by changing the corresponding phase comparator input signal B direction 136. The change in sign is counted by sign counter 138. The foregoing process will thereafter repeat, until the number of times the count sign signal 111 has changed exceeds the predetermined value of sign counter 138. At this time, sign count output signal 142 will operate to open switch 144, thereby removing oscillator output signal 124 from phase comparator input signal B 134, thereby terminating the process. It should be observed with respect to the operation of phase comparator 126 as previously discussed, that removal of oscillator output signal 124 from phase comparator input signal B 134 results in the continued operation of phase comparator 126 to maintain the current position with respect to motor 18, as a result of the information from tachometer 20 being continuously supplied to phase comparator input signal A 130 and phase comparator input signal A direction 132. The number of time the reference position is moved past transducing means 12, i.e., the pre-determined number associated with sign counter 138 is determined by the characteristics of the transport apparatus of magnetic tape 10, and is consequently application dependent. In the preferred embodiment of the present invention a predetermined value of four is selected.

It is observed that the foregoing described apparatus operates to position magnetic tape 10 in the desired position with respect to transducing means 12 between adjacent positions containing location information 14. FIG. 5 illustrates an alternate embodiment incorporating the apparatus and method of the present invention for positioning magnetic tape 10 with respect to transducing means 12. FIG. 5 is similar to FIG. 4, and like elements have been given corresponding reference designations. As the functions of many of the elements appearing in FIG. 5 have been previously discussed with reference to FIG. 4, the description of elements appearing in FIG. 5 will be limited to those elements whose functions differ from FIG. 4. Referring to FIG. 5, summing means 170 operates in a similar manner to summing means 96 of FIG. 4, with the addition of generating difference signal 172. Difference signal 172 indicates when the difference between the actual position of magnetic tape 10 with respect to transducing means 12 differs from the reference position as indicated by reference position count 92 by an amount less than a predefined amount, hereinafter referred to as DELTA. When the foregoing conditions exist, difference signal 172 assumes a true state; difference signal 172 assuming a false state otherwise. Difference signal 172 is coupled to timer 178. When difference signal 172 is in the false state, timer 178 is in a reset state. Timer 178, responsive to difference signal 172 being in the true state, operates to measure the amount of time difference signal 172 has continuously been in the true state. When the amount of time difference signal 172 has been in the true state exceeds a predefined maximum value, timer 178 functions to produce timer output signal 180. Timer output signal 180 is coupled to control the operation of switch 144 through switch 174, responsive to zero difference signal 100. In particular, when zero difference signal 100 indicates a zero difference between tape timer signal 63 and reference position time code 90, timer output signal 180 is coupled to control switch 144, and will function to open switch 144 thereby removing oscillator output signal 124 from phase comparator input B signal 134 in response to difference signal 172 remaining in the true state for a time period greater than the predetermined maximum value. In addition to the foregoing, count velocity distance profile means 182 is similar to count velocity distance profile 114, differing primarily in defining a zero desired velocity in response to a detected difference between a reference position as represented by reference position count 92 and the current position as represented by position counter 50 being less than the previously discussed DELTA amount. Count velocity distance profile means 114 otherwise serves to associate with the absolute value of displacements between a desired position on magnetic tape 10 and the current position, a desired velocity for the magnetic tape.

The operation of the apparatus of FIG. 5 is similar to that of FIG. 4, differing in the manner in which magnetic tape 10 is positioned with respect to transducing means 12 in response to a zero difference between the current position of magnetic tape 10 as represented by tape timer signal 63 and the desired position as represented by the count in position counter 50. In particular, when the difference between the desired position of magnetic tape 10 with respect to transducing means 12 and the current position thereof is less than the previously discussed DELTA amount, difference signal 172 assumes a true state, in response to which timer 178 begins the previously discussed timing operation. If magnetic tape 10 remains positioned with respect to transducing means 12 such that the difference between the reference position and the actual position remains less than the value of DELTA for the predefined time value associated with the operation of timer 178, timer 178 thereafter operates switch 144 by timer output signal 180 to open switch 144 thereby removing oscillator output signal 124 from phase comparator direction B signal 134. If however, the distance between the desired position and the actual position of magnetic tape 10 exceeds the value of DELTA prior to the expiration of the time associated with the operation of timer 178, difference signal 172 assumes the false state, thereby resetting timer 178 and terminating the timing operation. Timer 178 thereafter remains in the reset state until difference signal 172 again resumes a true state, thereby again starting the operation of timer 178 from an initial value of zero. The particular values chosen for DELTA and the time period associated with timer 178 are determined by the mechanical characteristics of the apparatus used herewith and are consequently application dependent.

FIG. 6 illustrates yet a different and the preferred manner for controlling the position of magnetic tape in accordance with the apparatus and method of the present invention, relying on a microprocessor 200 to determine the oscillator input signal 122 which is indicative of the tape position error. FIG. 6 is similar to FIGS. 4 and 5, and like elements have been corresponding reference designators. Referring to FIG. 6, microprocessor 200 is coupled to latch 208, latch 210, position counter 212 and latch 214 by data bus 202, control bus 204 and address bus 206. Data bus 202 and control bus 204 function to transfer data and control information respectively between microprocessor 200 and latch 208, latch 210, position counter 212 and latch 214. Address decode 216 is responsive to information present on address bus 206 and functions through address enable signals 218, 220, 222 and 224 to specify which of latch 208, latch 210, position counter 212 or latch 214, respectively, a particular operation of microprocessor 200 is associated with. Latch 208, responsive to microprocessor 200, functions to present information supplied thereto by data bus 202 to oscillator 120 and oscillator enable AND gate 126. In a similar fashion, latch 210, responsive to microprocessor 200, functions to present information supplied thereto by data bus 202 to phase comparator 126 direction B signal 136, and to present to microprocessor 200 information supplied from direction of displacement signal 26 from displacement and direction decode 22. Position counter 212 has displacement signal 24 and direction of displacement signal 26 supplied thereto, and functions in a similar manner to position counter 50 (FIG. 2). Position counter 212, responsive to information from microprocessor 200, will load an initial value therein for subsequent incrementing or decrementing the value therein in response to displacement signal 24 according to direction of displacement signal 26. It is understood with respect to the operation of position counter 212, that in response to the value therein reaching a predefined value, previously described with reference to position counter 50 as the count modulus of position counter 50, position counter will notify microprocessor thereof. Thereafter, microprocessor 200 will operate to up-date a tape timer identical in function to that described with respect to tape timer 62 of FIG. 5, in a manner well known to one of ordinary skill in the art. Latch 214 functions to couple information representative of a desired position of magnetic tape 10 with respect to transducing means 12 to microprocessor 200. The reproduction of location information 14 by transducing means 16 is coupled to a nonmaskable interrupt of microprocessor 200, and serves to direct microprocessor 200 to perform a designated sequence of instructions, as will be more fully discussed herein.

The apparatus of FIG. 6 operates to position a desired position on magnetic tape 10 with respect to transducing means 12 in a manner similar to the apparatus described with respect to FIGS. 4 and 5, and is presented in a flow chart format in FIGS. 7 thru 10. Referring first to FIG. 7, the passing of a location on magnetic tape 10 containing location information 14 past transducing means 16 operates to produce a non-maskable interrupt to microprocessor 200, as indicated in block 240. Thereafter, current processing being performed by microprocessor 200 as will be subsequently discussed herein with respect to FIGS. 8, 9 and 10 is suspended, and microprocessor 200 executes the function of block 242 to load position counter 212 with offset count 52. Offset count 52 is identical in function to that discussed with respect position counter 50 in connection with FIG. 2. Thereafter, microprocessor executes the function of block 244 to resume the processing previously being performed prior to execute the function of block 240.

Referring next to FIG. 8, discussion of the sequence of events associated with the controlling of position of magnetic 10 will begin at block 260. Subsequent to execution of the function of block 260, microprocessor 200 will delay for a pre-determined period of time represented at block 276, as discussed more fully hereinafter, thereafter performing the function of block 262. In executing the function of block 262, microprocessor 200 determines the desired location on magnetic tape 10 for positioning with respect to transducing means 12 by reading reference position 30 from latch 214. Thereafter, microprocessor 200 executes the function of block 264 to determine the difference between the reference position and the current position as maintained by microprocessor 200 in the previously discussed time code format. Next, the function of block 266 is executed by microprocessor 200 to determine if the difference determined in executing block 64 is greater than zero. If the difference is greater than zero, microprocessor next executes block 278 (FIG. 8B), otherwise it executes block 268. In executing block 268, microprocessor 200 determines the desired velocity for magnetic tape 10 according to the difference determined in block 264. The determination of a desired velocity is accomplished similar to the functions performed by time code velocity distance profile means 116 of FIGS. 4 and 5. The precise nature of the relationship between determined difference and desired velocity is dependent upon the mechanical characteristics of the apparatus associated with transporting magnetic tape 10 along the path, and is consequently application dependent. Thereafter, microprocessor 200 executes the function of block 270 to enable the coupling of oscillator output signal 124 (FIG. 6) to phase comparator input signal B 134 by enabling oscillator enable AND gate 126 through a logic true signal coupled thereto through latch 208. Thereafter, microprocessor 200 supplies a desired velocity signal previously determined in block 268 in the form of the desired speed to oscillator 120 by latch 208, and the desired direction to phase comparator signal B direction signal 136 through latch 210 by executing block 272. Thereafter, microprocessor 200 will set the variable ZEROCNT, as more fully discussed hereinafter, to a value of zero by executing the function of block 274, if the aforediscussed apparatus is arranged to operate as discribed with respect to FIG. 4. If the aforedescribed apparatus is arranged to operate as discussed with respect to FIG. 5, microprocessor 200 executes block 274 to reset the timer, as will be more fully discussed hereinafter with respect to block 320 in FIG. 10. Microprocessor 200 next executes a delay of a predetermined time at block 276. The predetermined delay is selected to allow for the displacement of magnetic tape 10 prior to repeating the performance of the previously described steps. After expiration of the predetermined delay, microprocessor 200 repeats the performance of the above described steps beginning with the function of block 262.

With respect to block 266, if the difference is not greater than zero, microprocessor 200 determines the desired count of position counter 212 for the reference position by executing the function of block 278 seen in FIG. 8B. This step corresponds to determining the number of tachometer pulses corresponding to the desired position of magnetic tape 10 with respect to transducing means 12. Next, microprocessor 200 executes the function of block 280 to determines the current count in position counter 212 by reading the value therein. Microprocessor 200 then determines the difference between the reference position and the count in position counter 212 by executing the function of block 284. This corresponds to the function performed by the summing means 96 (FIG. 4) in generating position count error signal 112. The sign of the difference is saved as the variable SIGN.

The next operations performed by microprocessor 200 is broadly described by block 286 as moving magnetic tape 10 to reference position. As previously discussed with respect to FIGS. 4 and 5, two different methods were discussed: the method performed by the apparatus of FIG. 4 achieved positioning of magnetic tape 10 with respect to transducing means 12 by alternating the direction of transport of the magnetic tape with respect to the desired tape position about transducing means 12, and is achieved with the apparatus of FIG. 6 according to the steps of FIG. 9; the method performed by the apparatus of FIG. 5 positioned magnetic tape 10 to within a distance of DELTA to the desired position, and thereafter terminating the positioning if the difference between the reference position and time code remained less than DELTA for a predetermined amount of time, and is performed by the apparatus of FIG. 6 by the steps illustrated in FIG. 10. It is consequently to be understood that the function of block 286 may be accomplished by either set of the steps discussed with respect to FIG. 9 and FIG. 10.

Referring first to FIG. 9, microprocessor 200 executes the function of block 290 to determine if the sign of the last difference, i.e, SIGN, is the same as the sign determined when executing the function of block 284. If there is a difference in sign, this indicates that magnetic tape 10 has been positioned past the reference position, and microprocessor 200 next performs the function of block 292. If the sign of the last difference is the same as the sign of the current difference, this indicates that magnetic tape 10 has not yet been transported past the reference position, and microprocessor 200 next executes the function of block 294. In block 292, microprocessor 200 increments the value of ZEROCNT, previously mentioned with respect to block 274 (FIG. 7). ZEROCNT serves to count the number of times the desired location of the magnetic tape 10 has been transported past the desired position. Thereafter, microprocessor 200 executes the function of block 293 to save the current value of the variable SIGN for future use in executing the function of block 290. Thereafter, microprosessor 200 executes the function of block 294. In block 294, microprocessor 200 determines if the value of ZEROCNT is equal to the maximum value. This is similar to the function performed by the apparatus of FIG. 4 with respect to sign count 138 in determining if the desired position on magnetic tape 10 has been transported past transducing means 12 the desired number of times. If the value of ZEROCNT is equal to the predetermined maximum value set for ZEROCNT, microprocessor 200 operates to disable oscillator enable AND gate 126 by executing the function of block 296 to remove the enable signal previously supplied to the gate through latch 208 in executing the function block 270 of FIG. 7. Thereafter, microprocessor 200 stops by executing the function of block 298.

If the value of ZEROCNT is not equal to the maximum value, microprocessor executes the function of block 300. In block 300, microprocessor 200 determines the desired velocity of magnetic tape 10 based upon the difference determined in executing block 284 of FIG. 8B. The determination of a desired velocity based upon a determined difference is similar to the functions performed by count velocity distance profile means 114 of FIG. 4. The precise nature of the relationship between determined distance and desired velocity is dependent upon the mechanical characteristics of the apparatus associated with transporting magnetic tape 10 along the path, and is consequently application dependent. Thereafter, microprocessor 200 executes the function of block 302 to couple the desired velocity determined in executing block 300 to oscillator 120 through latch 208, and the desired direction of movement of magnetic tape 10 to phase comparator signal B direction 136 through latch 210. Thereafter, microprocessor will repeat the above described process starting with the function described with respect to block 276 of FIG. 8A.

The positioning of magnetic tape 10 in accordance with the method described with respect to FIG. 5 is illustrated in the steps of FIG. 10. Referring to FIG. 10, microprocessor 200 executes the function of block 310 determine the desired velocity for the determined difference. Thereafter in block 312, microprocessor 200 outputs the desired speed to oscillator 120 through latch 208, and the direction of movement to phase comparator 126 signal B direction 136 through latch 210 by executing the function of block 312. Next, microprocessor 200 enables oscillator enable AND gate 126 through latch 208 by executing the function of block 314. Thereafter, the function of block 316 is executed by microprocessor 200 to determine if the absolute value of the difference is less than the aforedescribed DELTA. If the absolute value of the difference is less than DELTA, the functions associated with block 318 are executed by the mircroprocessor. On the other hand, if the difference is greater than DELTA the timer measuring interval that the difference was less than DELTA is reset by executing the function of block 320. Microprocessor then executes the return to block 276. If the difference was determined to be less, than DELTA in executing bock 316, microprocessor 200 executes the function of block 318 to determine if the absolute value of the difference has been less than delta for a time period exceeding a predetermined maximum time period. The predetermined maximum time period is the same time period discussed in connection with timer 178 (FIG. 5). If the absolute value of the difference has been less than DELTA in excess of the previously discussed time period, microprocessor 200 disables oscillator enable AND gate 126, through latch 208 by executing the function of block 322 and, thereafter executes the stop function of block 324.

The foregoing description of the apparatus and method of the present invention have been described with respect to controlling the position of a magnetic tape. However, it is to be understood that such discussion was for illustrative purposes; the apparatus and method of the present invention not thereby intended to be limited thereby, but only by the scope of the following claims.

I claim:

1. Apparatus for controlling the position of a web relative to a path along which it is transported, the web having a number of markers thereon from which positions on the web relative to the path can be determined, comprising:
    first means for transporting the web along the path;
    second means for detecting markers on the web as the web is transported along the path;
    third means independent of the markers responsive to the transport of the web along the path for generating first signals indicative of lengths of displacement of the transported web along the path, the third means generating a number of first signals for a selected length of displacement of the transported web greater than the number of markers detected during such displacement;
    fourth means responsive to the detection of markers and to first signals for generating a second signal indicative of the position of the web along the path corresponding to the length of displacement of the transported web indicated by said first signals following detection of a marker;
    fifth means for generating a reference signal representative of a selected position along the web relative to the a marker;
    sixth means responsive to the reference signal and the second signal for generating an error signal representative of a difference between the position of the web and the selected position; and,
    seventh means responsive to the error signal for controlling the first means to eliminate the difference between the position of the web and the selected position.

2. A method for controlling the position of a web relative to a path along which it is transported, the web having a number of markers thereon from which positions on the web relative to the path can be determined, comprising the steps of:
    transporting the web along the path;
    detecting markers on the web as the web is transported along the path;
    generating first signals independent of the markers and indicative of lengths of displacement of the transported werb along the path, the number of first signals generated for a selected length of displacement of the transported web being greater than the number of markers detected during such displacement;
    generating a second signal responsive to the detection of markers and to first signals, indicative of the position of the web along the path corresponding to the length of displacement of the transported web indicated by said first signals following detection of a marker;
    generating a reference signal representative of a selected position along the web relative to a marker;
    generating an error signal responsive to the reference signal and to the second signal, representative of a difference between the position of the web and the selected position; and,
    controlling the transport of the web responsive to the error signal to eliminate the difference between the positioned web and the selected position.

3. Apparatus for controlling the position of a magnetic tape relative to a path along which it is transported, the magnetic tape having a number of markers thereon from which positions on the magnetic tape relative to the path can be determined, comprising:
    means for transporting the web along the path;
    transducing means for detecting markers on the web as the web is transported along the path;
    tachometer means independent of the markers responsive to the transport of the magnetic tape along the path for generating first signals indicative of lengths of displacement of the transported magnetic tape along the path, the tachometer means generating a number of first signals for a selected length of displacement of the transported magnetic tape greater than the number of markers detected during such displacement;
    counter means responsive to the detection of markers and to first signals for generating a second signal indicative of the position of the magnetic tape along the path corresponding to the length of displacement of the transported web indicated by said first signals following detection of a marker;
    means for generating a reference signal representative of a selected position along the magnetic tape relative to the a marker;
    means responsive to the reference signal and the second signal for generating an error signal representative of a difference between the position of the magnetic tape and the selected position; and, means responsive to the error signal for controlling the first means to eliminate the difference between the position of the magnetic tape and the selected position.

4. Apparatus as recited in claim 3, wherein the markers are time code information.

5. Apparatus as recited in claim 3, wherein the markers are control track information.

6. Apparatus for controlling the position of a magnetic tape relative to a path along which it is transported with respect to a video transducing means, the magnetic tape having a number of markers thereon from which positions on the magnetic tape relative to the path can be determined, comprising:

means for transporting the web along the path;

marker transducing means for detecting markers on the magnetic tape as the magnetic tape is transported along the path;

tachometer means independent of the markers responsive to the transport of the magnetic tape along the path for generating first signals indicative of lengths of displacement of the transported magnetic tape along the path, the tachometer means generating a number of first signals for a selected length of displacement of the transported web greater than the number of markers detected during such displacement;

counter means responsive to the detection of markers and to first signals for generating a second signal indicative of the position of the magnetic tape with respect to the video transducing means along the path corresponding to the length of displacement of the transported magnetic tape indicated by said first signals following detection of a marker;

means for generating a reference signal representative of a selected position along the magnetic tape with respect to the video transducer means relative to the a marker;

means responsive to the reference signal and the second signal for generating an error signal representative of a difference between the position of the magnetic tape with respect to the video transducer means and the selected position; and, means responsive to the error signal for controlling the first means to eliminate the difference between the position of the magnetic tape relative to the video transducing means and the selected position.

7. Apparatus as recited in claim 6, wherein the markers are time code information.

8. Apparatus as recited in claim 6, wherein the markers are control track information.

9. Apparatus for controlling the position of a magnetic tape relative to a path along which it is transported with respect to a video transducing means, the magnetic tape having a number of markers thereon from which positions on the magnetic tape relative to the path can be determined, comprising:

means for transporting the magnetic tape along the path;

marker transducing means for detecting markers on the magnetic tape as the magnetic tape is transported along the path;

tachometer means independent of the markers responsive to the transport of the magnetic tape along the path for generating first signals indicative of lengths of displacement of the transported magnetic tape along the path, the third means generating a number of first signals for a selected length of displacement of the transported magnetic tape greater than the number of markers detected during such displacement;

counter means responsive to the detection of markers and to first signals for generating a second signal indicative of the position of the magnetic tape with respect to the video transducing means along the path corresponding to the length of displacement of the transported magnetic tape with respect to the video transducing means indicated by said first signals following detection of a marker;

means for generating a reference signal representative of a selected position along the magnetic tape with respect to the video transducing means relative to the a marker;

means responsive to the reference signal and the second signal for generating an error signal representative of a difference between the position of the magnetic tape with respect to the video transducing means and the selected position; and, means responsive to the error signal for controlling the transport means to eliminate the difference between the position of the magnetic tape and the selected position so that the velocity of the magnetic tape is responsive to a magnitude of the displacement of the magnetic tape relative to the transducing means from the desired position.

10. Apparatus as recited in claim 9, wherein the markers are time code information.

11. Apparatus as recited in claim 10, wherein the markers are control track information.

12. Apparatus as recited in claim 1, wherein said sixth means further comprises:

eighth means responsive to the magnitude of the difference between the reference signal and the second signal for generating a speed signal representative of a desired speed;

ninth means responsive to the reference signal and to the second signal for generating a sign signal indicative of the sign of the difference between the reference signal and the second signal;

counting means responsive to the sign signal for counting the occurrences of the sign signal, and generating an indication when the number of occurrences of the sign signal has not exceeded a predetermined number; and tenth means responsive to said counting means for generating an error signal having a magnitude responsive to said first means, and a sign responsive to said second means.

13. Apparatus as recited in claim 12 wherein said seventh means further comprises means for controlling the speed of the transport means responsive to the magnitude of the error signal in a direction responsive to the sign of the error signal.

14. Apparatus for transporting a movable web along a path so as to position a desired location on the movable web to a fixed point along the path of the movable web, said apparatus comprising:

means for producing a first signal indicating a current location relative to the fixed point of said web according to one of a plurality of periodic location indicators located contiguously with said web;

means for producing a second signal, independently of said periodic location indicators, indicating said current location of said web relative to said periodic location indicators;

means for producing a control signal in response to said first signal and said second signal such that said control signal reflects a diference in position between said desired location and said current location; and means for transporting said web to said desired location to the fixed point in response to said control signal.

15. Apparatus for positioning a transportable web of claim 14 wherein said second signal indicates said current position with higher resolution than said first signal.

16. Apparatus for positioning a transportable web of claim 14 wherein said second signal comprises tachometer pulses outputted by said means for positioning.

17. Apparatus for the determining a distance between a selected location on a transportable web and a fixed point along the web's path of travel, said apparatus comprising:

means for generating a first signal indicating the distance between the selected location on the web and the fixed point according to one of a plurality of periodic location indicators located contiguously with the web;

means for generating a second signal, independently of the periodic location indicators, indicating the distance between the selected location on the web and the one of the periodic location indicators;

means for generating a location signal in response to the first signal and the second signal such that said location signal reflects the location of said web.

18. Method for the determining of a distance between a selected location on a transportable web and a fixed point along the web's path of travel, comprising the steps of:

generating a first signal indicating the distance between the selected location on the web and the fixed point according to one of a plurality of periodic location indicators located contiguously with the web;

generating a second signal, independently of the periodic location indicators, indicating the distance between the selected location on the web and the one of the periodic location indicator;

generating a location in response t the first signal and the second signal such that said location signal reflects the location of said web.

* * * * *

UNITED STATES PATENT AND TRADEMARK OFFICE
CERTIFICATE OF CORRECTION

PATENT NO.  : 4,692,819
DATED       : September 8, 1987
INVENTOR(S) : Robert Steele It is certified that error appears in the above-identified patent and that said Letters Patent is hereby corrected as shown below:

```
Column  2, line 32, delete "crated" insert --created--;
           line 61, delete "that" insert --than--;
Column 10, line 25, delete "counter" insert --count--;
           line 37, after "111" insert --to--;
Column 13, line 39, delete "resumes" insert --assumes--;
Column 14, line 69, delete "64" insert --264--;
Column 15, line 28, delete "discribed" insert --described--;
           line 49, delete "determines" insert --determine--;
Column 17, line  2, after "310" insert --to--;
           line 22, delete "bock" insert --block--;
           line 68, delete "a";
Column 18, line 19, delete "werb" insert --web--;
           line 64, delete "a";
Column 19, line 38, delete "a";
Column 20, line 15, delete "a".
```

Signed and Sealed this

Third Day of May, 1988

*Attest:*

DONALD J. QUIGG

*Attesting Officer*   Commissioner of Patents and Trademarks